United States Patent
Weigel

(10) Patent No.: US 6,178,283 B1
(45) Date of Patent: Jan. 23, 2001

(54) END PIECE FOR A FIBER-OPTIC CABLE

(75) Inventor: Hans-Dieter Weigel, Berlin (DE)

(73) Assignee: Infineon Technologies AG, Munich (DE)

(*) Notice: Under 35 U.S.C. 154(b), the term of this patent shall be extended for 0 days.

(21) Appl. No.: 09/138,347

(22) Filed: Aug. 21, 1998

(30) Foreign Application Priority Data

Aug. 21, 1997 (DE) .............................. 197 37 427

(51) Int. Cl.⁷ ....................................... G02B 6/00
(52) U.S. Cl. .............................. 385/139; 385/86; 385/87
(58) Field of Search .................... 385/86, 87, 139

(56) References Cited

U.S. PATENT DOCUMENTS 5,140,662   8/1992   Kumar .
5,222,169 * 6/1993   Chang et al. .......................... 385/87

FOREIGN PATENT DOCUMENTS

3813076A1   11/1989   (DE) .
4031612A1    4/1992   (DE) .

* cited by examiner

Primary Examiner—Darren Schuberg
Assistant Examiner—Fayez Assaf
(74) Attorney, Agent, or Firm—Herbert L. Lerner; Laurence A. Greenberg; Herbert L. Lerner

(57) ABSTRACT

An end piece for a fiber-optic cable, with a sheath and strength members. An insert of the end piece has a rear hollow cylindrical attachment. The attachment has a rear end section with an outer swelling and a section nearer the front, which is free from the sheath. An end of the sheath is pushed onto the end section over the swelling. The section towards the front is covered by the strength member, which project from the sheath end. A common sleeve 6 is applied to the attachment in such a way that it fixes both the end of the sheath on the end section and the strength members on the section towards the front.

5 Claims, 1 Drawing Sheet

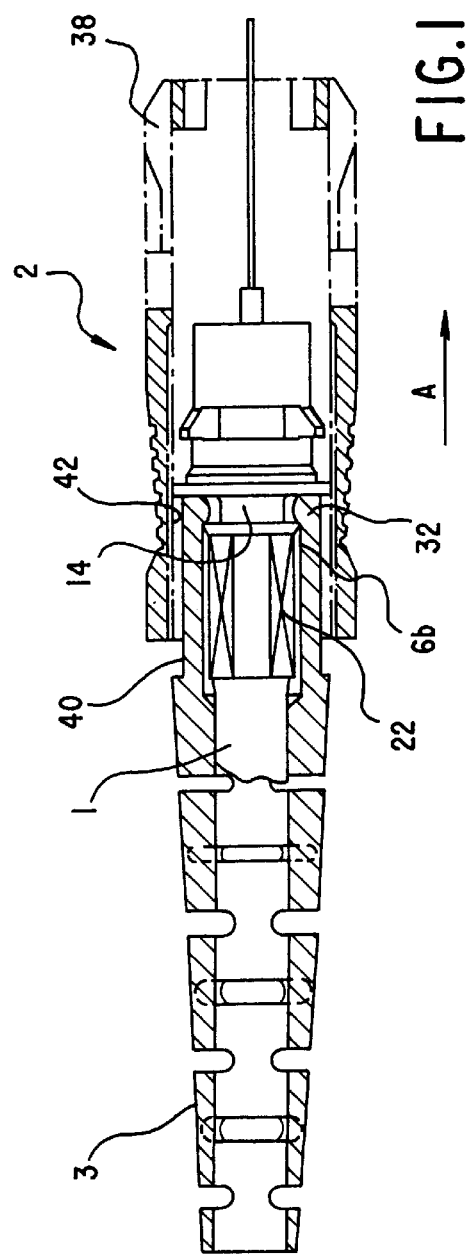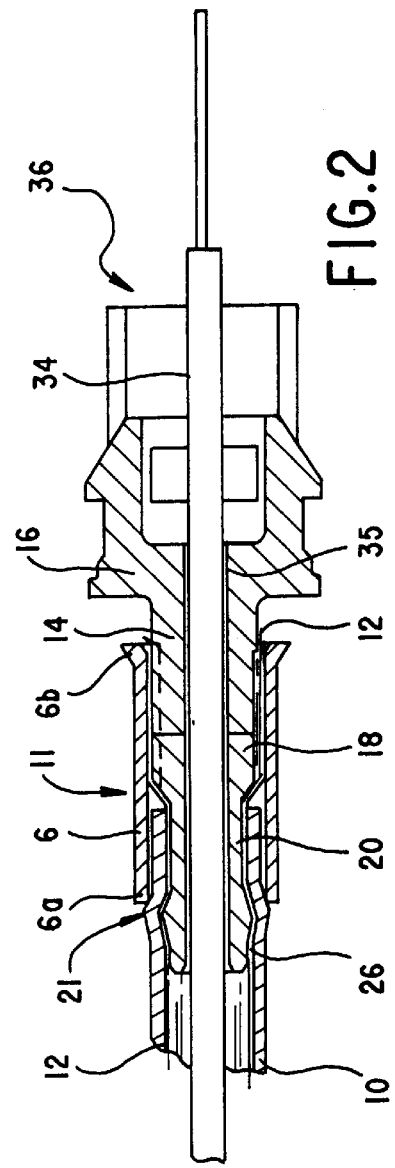

END PIECE FOR A FIBER-OPTIC CABLE

BACKGROUND OF THE INVENTION

FIELD OF THE INVENTION

The invention lies in the field of optical connectors. In particular, the invention pertains to an end piece for a fiber-optic cable, which comprises at least one optical fiber, a sheath, and strength members.

In order to ensure uninterrupted protection against tensile stresses of an optical fiber, to be coupled to a fiber optic cable connector or housing, for example, of a fiber optic cable, strength members running in the cable are usually fixed to the plug or housing through special measures.

Such a fixture is disclosed, for example, in German published, non-prosecuted application DE 40 31 612 A1. There, stress fibers of a fiber-optic cable which is freed from its sheath at the end, which fibers serve as strength members, are fixed between a cylindrical rear connector extension and a sleeve pressed onto this extension. Since the sheath end is not fixed at the end itself, tensile forces acting on the sheath can pull the latter away axially from the connector extension. As a result, the stress fibers, and an optical fiber guided in the cable are partially exposed and subjected to environmental influences. It is thereby quite possible for the optical fiber to become damaged.

Another relatively complicated connection between a fiber optic cable and a connector is described in German published, non-prosecuted application DE 38 13 076 A1. Stress fibers and the sheath of the fiber-optic cable are commonly fixed by self-closure between a loose sleeve that is pushed under the stress fibers and the sheath, and an outer pinch sleeve. The sheath is firstly partially removed from the end of the cable, with the result that the stress fibers project beyond the sheath end. Subsequently, the projecting stress fibers are turned back over the sheath end and thereby cover the sheath on its outside. The pinch sleeve now pushed over this region is pressed onto the sleeve, already brought under the stress fibers, by applying a plurality of annular beads. It is thereby possible for the optical fiber guided in the loose sleeve in slotted longitudinal bores to become jammed.

U.S. Pat. No. 5,140,662 to Kumar describes a method of fastening an end of a fiber-optic cable end to a connector end piece without any adhesive. The rear end of the end piece has an insertion sleeve with a smaller outside diameter and an adjoining sleeve piece with a structured sheath surface and a larger outside diameter. An end of the optical fiber which is freed from its outer sheath in a fashion exposing stress elements is fixed in the insertion sleeve by crimping. Subsequently, an outer crimping sleeve is pushed over the stress elements and crimped, thus fixing the stress elements.

SUMMARY OF THE INVENTION

It is accordingly an object of the invention to provide an end piece for a fiber optic cable, which overcomes the above-mentioned disadvantages of the heretofore-known devices and methods of this general type and which permits the strength member and sheath to be fixed reliably in conjunction with a simple production with few components.

With the foregoing and other objects in view there is provided, in accordance with the invention, an end piece for a fiber-optic cable having a cable sheath and strength members, comprising:

an insert with a rear hollow attachment having:

a rear end section formed with an outer swelling adapted to receive thereon an end of a cable sheath of a fiber-optic cable; and a section forwardly adjacent the rear end section in a plug-in direction of the fiber-optic cable that remains free from the cable sheath but is covered by strength members of the fiber-optic cable that project beyond the cable sheath end; and a sleeve disposed on the rear hollow attachment and embracing and fixing the end of the cable sheath on the rear end section and the strength members on the section forwardly adjacent the rear end section.

In other words, the objects of the invention are satisfied by the rear end section with an outer swelling onto which the sheath is pushed. The segment of the insert just in front of the rear end section remains free from the sheath. The strength member(s), instead, cover that forward section. A sleeve is mounted on the attachment in such a way that the sleeve both fixes the end of the sheath on the end section and fixes the strength member on the forward segment.

An essential advantage of the invention consists in that the strength member and sheath are partially fixed by a single sheath of simple configuration. The spatially separated fixing of the sheath in the rear end section, as well as of the strength members in the section nearer the front permits the rear attachment to be shaped in a fashion optimally adapted to the materials to be fixed. Particularly advantageous is the fixing of the strength member between the sleeve and attachment without the interposition of the sheath, the result being a particularly reliable fixation of the strength member.

In accordance with a added feature of the invention, the sleeve is a crimping sleeve crimped onto the rear end section with the cable sheath interposed between the crimping sleeve and the rear end section, and crimped onto the section forwardly adjacent the rear end section with the strength members interposed between the crimping sleeve and the section forwardly adjacent the rear end section. This permits the sheath and strength member to be fixed in a single crimping operation.

In accordance with an additional feature of the invention, the sleeve is disposed forward of the swelling in the plug-in direction. In other words, the rear first contact region is situated between the sleeve and the sheath behind the swelling when seen in the push-on direction of the sheath. In the case of tensile stress, the sheath material is prevented thereby from flowing on this swelling. The friction occurring along the surface of the swelling between the sheath and attachment distributes the transfer of the tensile stress onto the attachment over a relatively large area of the sheath, and thereby reduces the risk of local overloading of the sheath material. On the other hand, the sheath is not pressed with sharp edges onto the swelling, and pinching is thereby avoided.

In accordance with a further feature of the invention, there is provided an anti-kink sleeve pushed onto an end of the sleeve facing toward a front of the end piece in the plug-in direction. The end of the sleeve which is near the front thus serves to fix an anti-kink sleeve pushed on in the push-on direction. It is therefore easy for the anti-kink sleeve to be fastened to the attachment. There is no need for an additional and cost-intensive fixing.

In accordance with a concomitant feature of the invention, the anti-kink sleeve is rotatably mounted on the end of the sleeve facing toward the end. Thus, any rotation of the anti-kink sleeve is not transmitted via the insert onto the optical fiber or onto other parts of the connector and serves to prevent torsional stresses, in particular during the mounting process. It is thus likewise a simple possibility to make any necessary alignment of the anti-kink sleeve and insert at the correct angle of rotation when they are jointly held in, for example, a connector housing.

Other features which are considered as characteristic for the invention are set forth in the appended claims.

Although the invention is illustrated and described herein as embodied in an end piece for a fiber-optic cable, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a longitudinal section through a completely assembled end piece according to the invention;, and FIG. 2 is a partial longitudinal section of an insert with the sheath pushed on.

DESCRIPTION OF THE PREFERRED EMBODIMENTS

Referring now to the figures of the drawing in detail, there is seen a fiber-optic cable 1 fastened to a connector 2.

During mounting, an anti-kink sleeve 3 and a sleeve 6 (FIG. 2) are first pushed onto the cable 1. Subsequently, an end section 11 of the cable is partially freed from its sheath 10, with the result that strength member 12 (FIG. 2) are exposed. The strength member 12 preferably comprise stress fibers, for example aramid fibers. Subsequently, a rear attachment 14 of a connector insert 16 is pushed so far under the stress fibers 12 and the sheath 10 that the stress fibers 12 cover a section 18 near the front, and the sheath 10 covers only a rear section 20 of the attachment 14. The section 18 near the front is knurled on its outside.

The sleeve 6 is positioned such that its rear end 6a (with reference to the plug-in direction or push-on direction A) is situated behind a swelling 26 on the rear section 20. There it forms a first rear contact region 21 with the sheath 10. The sleeve 6 is crimped onto the attachment 14, for example with a hexagonal crimping tool. The sheath 10 and the stress fibers 12 are thus securely fixed in each case. An equivalent effect can also be achieved with a shrink-on sleeve, whose diameter is reduced, for example under the effect of heat, instead of the crimping sleeve 6.

Extracting the stress fibers 12 from their fixture is rendered substantially more difficult by virtue of the fact that the sheath 10 is not interposed between the stress fibers and the crimping sleeve 6 in the region near the front. The stress fibers 12 are pressed directly by the sleeve 6 onto the section 18 nearer the front, which has a knurled finish.

In addition, the anti-kink sleeve 3 is pushed forwards, with its inside swelling 32, in the push-on direction A over the sleeve 6. The result is that the inside swelling 32 latches behind a sawtooth end 6b of the sleeve 16. The dimensions of the inside swelling 32 and the sawtooth end 6b are coordinated in such a way as to prevent the anti-kink sleeve from being stripped off against the push-on direction by the sawtooth end. Since the sleeve 6 is crimped not over the entire length but only up to the start of the end 6b, the latter remains in its originally round form and permits the anti-kink sleeve to be rotatably mounted.

The insert 16 is hollow, and it is formed with a through bore 35. An optical fiber 34 of the fiber-optic cable 1 is guided in the through bore 35. The front region 36 of the connector insert 16 is shaped to be suitably held in a connector housing 38.

The end piece for the fiber-optic cable can thus be produced efficiently and simply and with few components. By virtue of the rotatable mounting of the anti-kink sleeve, when the latter is pushed onto the connector insert, there is no need to pay heed to correct alignment with regard to its angular orientation. Only upon being inserted into the connector housing is the anti-kink sleeve fixed securely in terms of rotation by the interaction of its outer contour 40, which is of rectangular design in the region nearer the front, with the mating inner contour 42 of the connector housing 38.

I claim:

1. An end piece for a fiber-optic cable having a cable sheath and strength members, comprising:

an insert with a rear hollow attachment having:
 a rear end section formed with an outer swelling adapted to receive thereon an end of a cable sheath of a fiber-optic cable; and
 a section forwardly adjacent said rear end section in a plug-in direction of the fiber-optic cable that remains free from the cable sheath but is covered by strength members of the fiber-optic cable that project beyond the cable sheath end; and a sleeve disposed on said rear hollow attachment and embracing and fixing the end of the cable sheath to said swelling of said rear end section and the strength members to said section forwardly adjacent said rear end section.

2. The end piece according to claim 1, wherein said sleeve is a crimping sleeve crimped onto said rear end section with the cable sheath interposed between said crimping sleeve and said rear end section, and crimped onto the section forwardly adjacent said rear end section with the strength members interposed between said crimping sleeve and said section forwardly adjacent said rear end section.

3. The end piece according to claim 1, wherein said sleeve is disposed forward of said swelling in the plug-in direction.

4. The end piece according to claim 1, which further comprises an anti-kink sleeve pushed onto an end of said sleeve facing toward a front of the end piece in the plug-in direction.

5. The end piece according to claim 4, wherein said anti-kink sleeve is rotatably mounted on the end of said sleeve facing toward the end.

* * * * *